United States Patent [19]

Schultze

[11] Patent Number: 4,943,262
[45] Date of Patent: Jul. 24, 1990

[54] BEARING ASSEMBLY FOR THE CROSS MEMBER OF A UNIVERSAL JOINT

[75] Inventor: Jürgen Schultze, Essen, Fed. Rep. of Germany

[73] Assignee: GKN Cardantec International Gesellschaft für Antriebstechnik mbH, Essen, Fed. Rep. of Germany

[21] Appl. No.: 316,868

[22] Filed: Feb. 28, 1989

[30] Foreign Application Priority Data

Feb. 29, 1988 [DE] Fed. Rep. of Germany ....... 3806397

[51] Int. Cl.⁵ .............................................. F16D 3/41
[52] U.S. Cl. ..................................... 464/131; 464/136
[58] Field of Search ................ 277/152; 384/126, 127, 384/484, 486, 564; 464/11, 14, 128, 131, 132, 136

[56] References Cited

U.S. PATENT DOCUMENTS

| 2,773,367 | 12/1956 | Slaght | 464/131 X |
| 2,794,693 | 6/1957 | Burkhalter et al. | 464/131 X |
| 2,996,901 | 8/1961 | Kleinschmidt | 464/131 |
| 3,592,022 | 7/1971 | Stokely | |
| 4,173,129 | 11/1979 | Durham | 464/131 X |
| 4,317,340 | 3/1982 | Krude et al. | 464/131 X |
| 4,324,114 | 4/1982 | Durham | 464/131 |
| 4,419,086 | 12/1983 | Condon | 464/131 X |
| 4,834,691 | 5/1989 | Schultze et al. | 464/131 |

FOREIGN PATENT DOCUMENTS

| 2536113 | 10/1976 | Fed. Rep. of Germany . |
| 2718503 | 11/1978 | Fed. Rep. of Germany . |
| 3109787 | 1/1982 | Fed. Rep. of Germany . |
| 3115659 | 11/1982 | Fed. Rep. of Germany ...... 464/128 |
| 8416023 | 8/1984 | Fed. Rep. of Germany . |
| 8631594 | 2/1987 | Fed. Rep. of Germany . |

Primary Examiner—Daniel P. Stodola
Attorney, Agent, or Firm—Toren, McGeady & Associates

[57] ABSTRACT

The invention relates to a bearing assembly for a cross member. To avoid any negative influences of axial forces which occur during the operation of the universal joint and which make it necessary to provide axial support for the rolling members, there have been provided supporting discs which are supported directly, via a bore, on a step of the arm. The seal which is located axially in the direction of the open end of the bearing bush is not subjected to any axial forces, as a result of which disadvantageous influences on the sealing effect of the seal are avoided. Furthermore, there is no need for any special fixing arrangement for the seal, with the exception of providing a seat which permits a defined association with the bearing bush.

5 Claims, 3 Drawing Sheets

BEARING ASSEMBLY FOR THE CROSS MEMBER OF A UNIVERSAL JOINT

BACKGROUND OF THE INVENTION

The invention relates to a bearing assembly for supporting the arms of a cross member of a universal joint in associated joint yokes, with axially fixed bearing bushes which are received in the bores thereof and in each of which an arm is received with rolling members arranged therebetween. The end faces of the arms are supported relative to the base of the bearing bushes and the annular space towards the open end of the bearing bush containing a supporting disc holding the rolling members as well as a seal for sealing the bearing space between the inner wall of the bearing bush and the outer face of the arm.

With prior art assemblies of this type, the supporting disc is directly supported as a separate component on the seal fixed in the bearing bush or on the arm, for example.

There are other prior art solutions where the supporting disc for the rolling members is inserted into the seal by vulcanization measures, for example DE GM No. 8416023.3.

The disadvantage of the two above-mentioned designs is that the supporting forces have to be received via the seal. This has an adverse effect on the sealing effect because the supporting forces cause the seal to be deformed, which in turn affects the contact between the sealing lips and the associated sealing faces. Such deformation has an additional disadvantage in that it is possible for the rolling members to carry out a limited axial movement and there is a risk of them taking up an inclined position.

SUMMARY OF THE INVENTION

It is therefore an object of the present invention to provide a bearing assembly in which the seal itself or even the holding means for the seal are free from axial forces exerted by the bearing members, i.e., they are not subjected to any loads exerted by them.

Pursuant to this object, and others which will become apparent hereafter, one aspect of the present invention resides in the supporting disc provided with a bore being supported on a step of the associated arm of the cross member in the direction of its axis of rotation. Additionally, in the region adjoining the supporting disc, in the direction of the open end of the bearing bush, the seal is inserted into the annular space and firmly associated, especially with the bearing bush.

The advantage of this design is that the rolling members are supported axially, i.e., in the direction of the axis of rotation of the cross member, directly on a separate supporting disc which in turn is firmly axially supported on the step of the associated arm. The axially following seal inserted into the annular space is free from any axial forces, i.e., it does not even have to be fixed to the associated receiving means relative to which it should be arranged in a non-rotating way. As a rule, a friction locking connection is sufficient. In a preferred embodiment the seal is firmly associated with the bearing bush, i.e., it is firmly supported on the inner wall of the bearing bush to create a friction locking effect, with the fixing means or the friction locking connection being dimensioned in such a way that the seal is pressed out of its seat as a result of the pressure of the lubricant pressed therein. As the arrangement of the supporting disc ensures a sufficiently large number of throttle gaps, the pressure during the course of lubrication is reduced to such an extent that no worthwhile pressing-out forces occur. Furthermore, as a rule, the sealing lips are arranged in such a way that they open under the lubrication pressure so that lubricant can escape.

In a preferred embodiment, the step is designed as a face conically increasing towards the open end of the bearing bush and the supporting disc is provided with a corresponding conical bore. This design permits the arm of the cross member to be shaped in such a way that it does not change its diameter stepwise, i.e., a good transition is achieved without there being any strength-reducing notches.

To facilitate through-lubrication, the supporting disc, in its region adjoining the bore, is provided with circumferentially distributed recesses for forming through-channels. These end in the region of the sealing lips so that the ejected lubricant may lift these off their seat in the direction of flow. To prevent any pressure from building up, the sum of the passage cross-sections of the through-channels is greater than that of the lubricating grooves in the end disc.

In a further embodiment, in order to increase the supporting force for the supporting disc in its region adjoining the step, the disc comprises an axially projecting reinforcing collar in which the bore is positioned.

Finally, it is proposed to manufacture the supporting disc from polyamide. On the one hand, this material has a sufficiently high strength for effectively supporting the rolling members and, on the other hand, if paired with the cross member made of steel, it exhibits good sliding properties so that the supporting disc is able to move on the step without generating a high friction effect or wear symptoms if the axial forces transmitted by the rolling members increase.

A preferred embodiment is described below in connection with the accompanying drawing.

DETAILED DESCRIPTION OF THE PREFERRED EMBODIMENT

Figure 1:
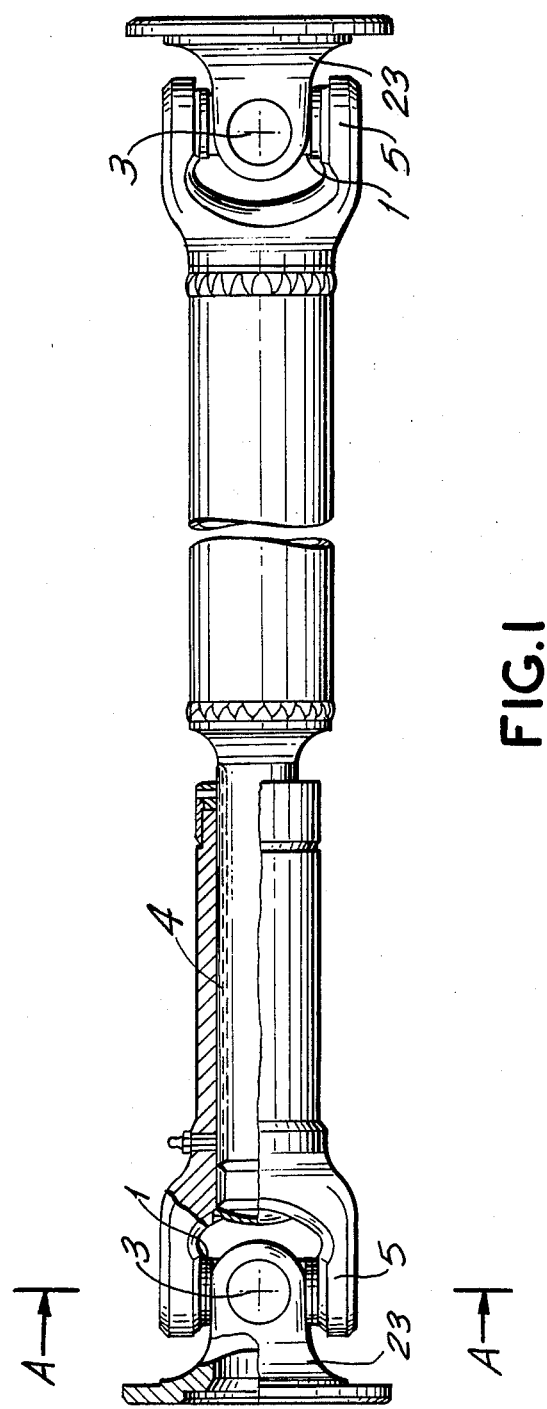
FIG. 1 is a diagrammatic illustration of a driveshaft.

The universal joint shaft shown in FIG. 1 consists of two universal joints 3 connected to each other by an intermediate shaft 4. The intermediate shaft 4 ensures a torque transmitting connection, but it also permits changes in length between the two universal joints 3. The two universal joints 3 each comprise two yokes 5, 23 containing bores in which the arms of a cross member 1 are received with bearing assemblies arranged therebetween. One of the yokes is designed as a driving yoke 5 and the other one as a flange yoke 23. The flange yokes 23, with their flanges, permit fixing to a driving or driven machine element.

Figure 2:
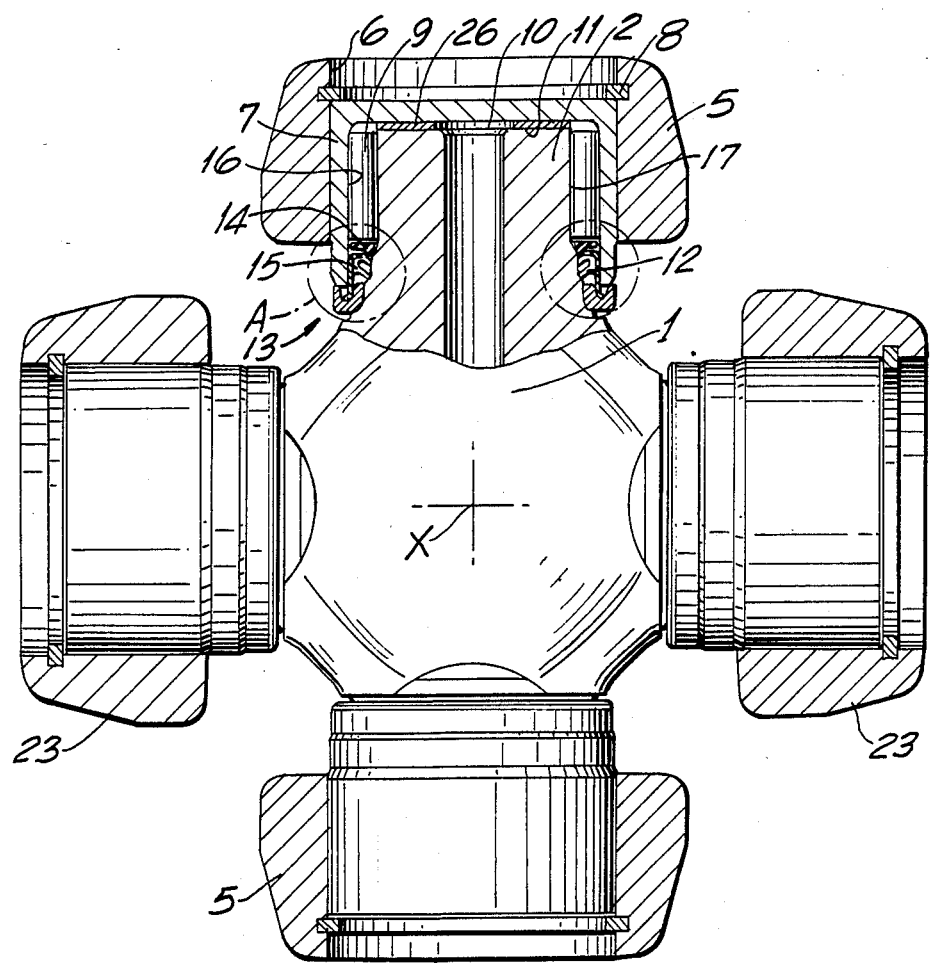
FIG. 2 is a partial section A—A to FIG. 1 in an enlarged scale.

As can be seen from FIG. 2, the cross member 1 comprises two arms 2 arranged at right angles relative to each other. Each arm 2 is received in a bearing bush 7 with rolling members 9 arranged therebetween. The bearing bush 7 has been inserted into the bore 6 of the associated driving yoke 5 and flange yoke 23 and secured against axial displacement via a securing ring 8. Rolling members 9 are rollingly arranged on cylindrical outer faces 17 of the arms 2. The members 9 also roll on the inner wall 16 of the bearing bush 7. The arms 2 are supported on their end faces 10, for instance by providing an intermediate stop disc 26 at the base 11 of the bearing bush 7. However, in view of the types of material selected for pairing, it is also possible for the stop disc 26 to be eliminated and for the arm end face 10 to rest directly on the base 11 of the bearing bush 7.

Figure 3:
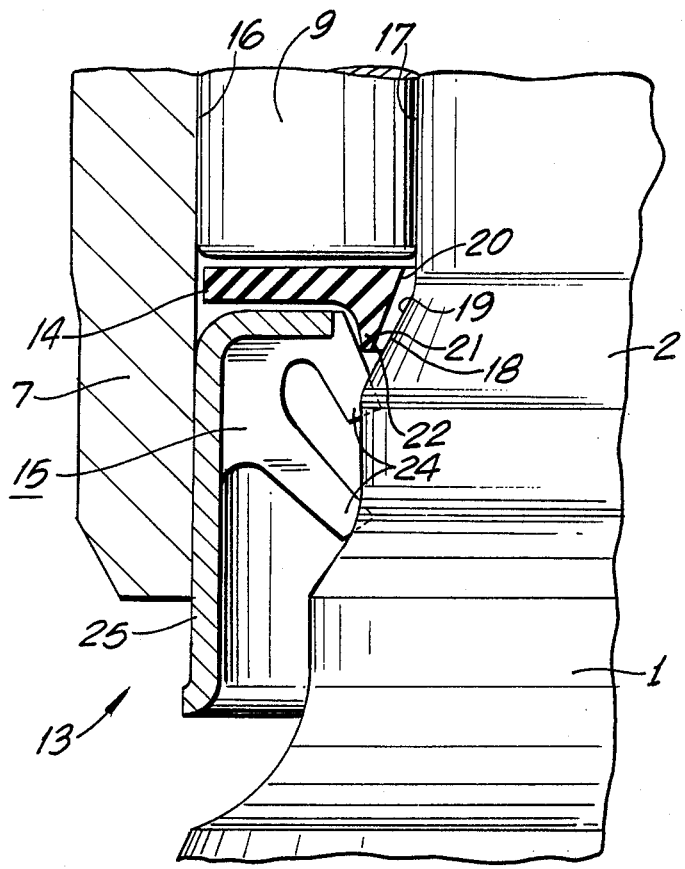
FIG. 3 is a detail A to FIG. 2 in an enlarged scale.

In the direction of the open end 13 of the bearing bush 7, the rolling members 9 arranged around the circumference of the arm outer face 17 are supported on a supporting disc 14. The supporting disc 14 comprises a conical bore 18 which, as can be seen in FIG. 3, is located in the region of the supporting disc provided with a reinforcing collar 22. By means of the conical bore 18, the supporting disc 14 is supported on a step 19 of the arm 2, which increases conically in the direction of the axis of rotation X and the open end 13 of the bearing bush 7, i.e., the supporting disc 14 is axially fixed relative to the arm 2 and accommodates the axial forces occurring during articulation and rotation of the universal joint 3 and causes a displacement of the rolling members 9. The rolling members 9, with their end faces, are supported on the supporting disc 14. The axial force is introduced into the arm 2 via the supporting disc 14 and the stop 19.

In the axially adjoining region extending in the direction of the axis of rotation X and the open end 13 of the bearing bush 7, there is provided in the annular space 12 formed in this region between the inner wall 16 of the bearing bush 7 and the arm outer face 17 a seal 15 for sealing the bearing space. As can be seen in FIG. 3, the seal 15 is preferably firmly associated with the bearing bush 7. The seal 15 comprises a metallic reinforcing sleeve 25 to which the soft sealing part comprising the sealing lips 24 is vulcanized. As can also be seen in FIG. 3, the sealing lips 24 point in the direction of the open end 13 of the bearing bush 7. The seal 15 is inserted into the bearing bush 7 via friction locking only, there being no need for any special fixing means such as indentations or other connecting means.

Figure 4:
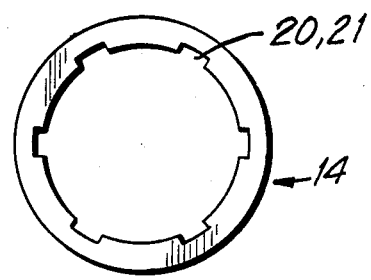
FIG. 4 is a plan view of the supporting disc.

As can be seen in FIGS. 3 and 4 in particular, the supporting disc 14 has been provided with circumferentially distributed recesses 20 in the region of its conical bore 18. When the supporting disc 14 with its conical bore 18 rests against the conical step 19 of the arm, these circumferentially distributed recesses 20 form through-channels 21 between the two. During lubrication, i.e., when pressing lubricant into the region of the rolling members 9 via lubricating bores provided for instance in the cross member and entering the arm end faces 10, these lubricating channels 21 ensure that the lubricant can reach the region of the sealing lips 24 which, due to being arranged so as to extend in the direction of the axis of rotation X, can lift off under the pressure of the lubricant, thereby permitting used lubricant to emerge. The arrangement of the lubricating channels 21 and especially their cross-sectional shape, i.e., the gap effect caused by the through-channels 21, ensure that the lubricating pressure is reduced and that the seal 15, for example, cannot be pressed out of its seat in the bearing bush 7 due to the lubricating pressure. An essential advantage achieved by the selected arrangement and firm association of the seal 15 with the bearing bush 7 is that it is possible to produce a preassembled unit consisting of the bearing bush 7, the end stop disc 26, the rolling members 9, the supporting disc 14, the seal 15 and possibly a further preseal. After fitting the cross member 1 in the bore 6 of the joint yoke 5 and flange yoke 23, this unit as a whole may be inserted from the outside onto the arms 2.

It is also conceivable for the seal to be firmly associated with the cross member. However, in such a case the fits have to be chosen to be such that when axial forces occur, it is possible for the supporting disc to rest against the stop 19, i.e., that the seal 15 can be displaced to such an extent that there is a sufficient clearance of movement.

While the invention has been illustrated and described as embodied in a bearing assembly for the cross member of a universal joint, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A bearing assembly for supporting arms of a cross member of a universal joint in associated joint yokes, comprising:
   axially fixed bearing bushes received in bores of the yokes and in each of which an arm is received with rolling members arranged therebetween, end faces of the arms being supported relative to a base of the bearing bushes, the bearing bush having an annular space towards an open end thereof;
   a seal for sealing the annular space between the inner wall of the bearing bush and the outer face of the arm; and
   a supporting disc provided so as to hold the rolling members, the supporting disc having a bore and being supported on a step of an associated arm of the cross member in the direction of its axis of rotation, and in a region adjoining the supporting disc, in the direction of the open end of the bearing bush, the seal is inserted into the annular space and firmly seated, the step having a face conically increasing towards the open end of the bearing bush, and the supporting disc having a corresponding conical bore.

2. A bearing assembly according to claim 1, wherein the seal is firmly engaged with the bearing bush.

3. A bearing assembly according to claim 1, wherein in the region of the bore the supporting disc is provided with circumferentially distributed recesses so as to form through-channels.

4. A bearing assembly according to claim 1, wherein the supporting disc is provided with an axially projecting reinforcing collar in its region adjoining the step, the bore being positioned in the reinforcing collar.

5. A bearing assembly according to claim 1, wherein the supporting disc is made of polyamide.

* * * * *